July 13, 1965  H. STANEK  3,194,211
TRANSPORT AND COOLING CONTAINER FOR LIVING FISH ROE AND/OR FRY
Filed Oct. 8, 1963  2 Sheets-Sheet 1
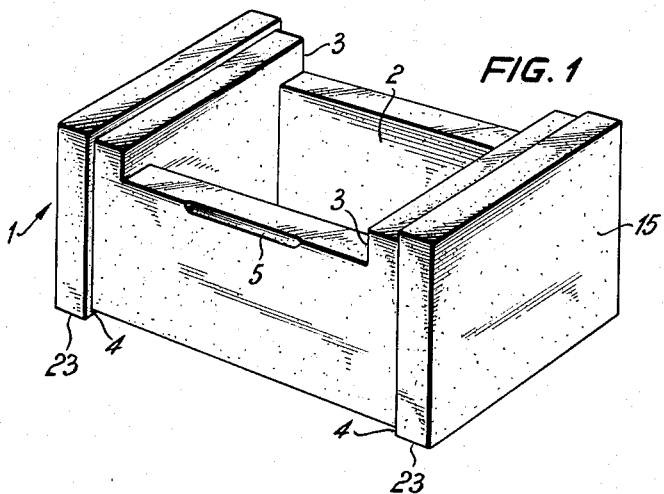
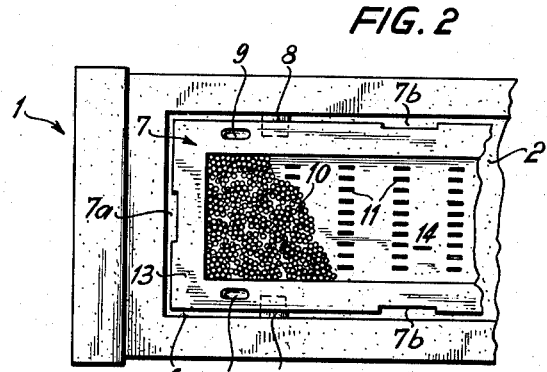
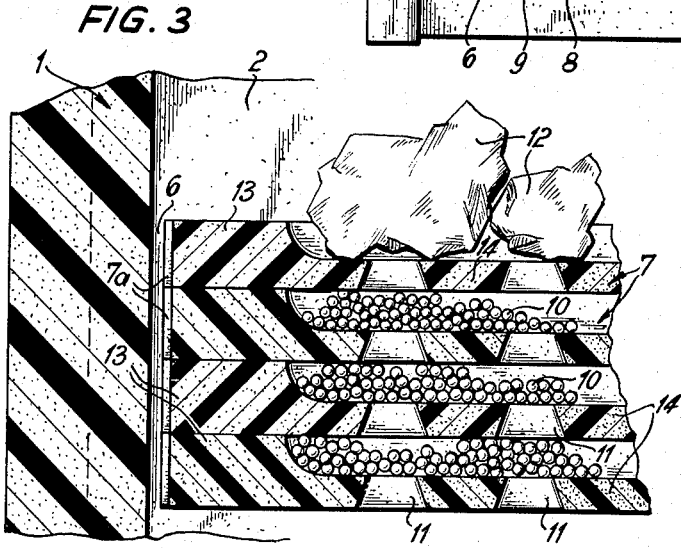
INVENTOR
Heinz Stanek July 13, 1965  H. STANEK  3,194,211
TRANSPORT AND COOLING CONTAINER FOR LIVING FISH ROE AND/OR FRY
Filed Oct. 8, 1963  2 Sheets-Sheet 2

INVENTOR
Heinz Stanek
By Richard Ernst
agt

3,194,211
TRANSPORT AND COOLING CONTAINER FOR LIVING FISH ROE AND/OR FRY
Heinz Stanek, Rosenstrasse 18, Starnberg, Germany
Filed Oct. 8, 1963, Ser. No. 314,808
Claims priority, application Germany, Oct. 9, 1962,
S 19,820
7 Claims. (Cl. 119—3)

The invention relates to a transport and cooling container for living fish roe and/or fry, especially for fresh water breeding fish.

It is known to use shallow picture frame-like wooden frames covered with cloth on one side only for packing living fish roe and/or fry. The thus covered wooden frames form a shallow container, a tray, into which the fish roe and/or fry is filled by means of bird feathers. The covered wooden frames containing the fish roe or fry are piled one upon the other, tied up and put into a wooden box the interior of which is covered with wood-wool, peat, sawdust or moss. Furthermore a small box containing ice is put on the piled up wooden frames. The ice is to keep the roe or the fry cool and moist. Fish roe dies immediately if its temperature exceeds a certain limit which differs with the various kinds of fish, or if it becomes dry or suffocated under water, or because of any other lack of air. Besides the fact that this kind of packing is complicated it is another disadvantage that in many cases the roe or the fry is crushed by the wooden frames.

Compared to this, the transport and cooling container according to the invention is characterized by a thermically insulated container for the reception of a plurality of pileable frames beneath which a chamber for collecting the melted ice is provided. Ice may be put on the top frame. A moisture absorbent material like moss or felt is preferably arranged in the chamber beneath the frames which prevents that the melted ice may sway to and fro and thus suffocate the roe and/or fry in the bottom frame.

Preferably the container shows a shallow channel or groove along its whole circumference comprising also the lid. In this channel, also referred to as a sunken region, a simple paper band may be inserted encircling the whole container. It is useful to strengthen the paper band in its longitudinal direction by glued in strings or glass fiber cords.

The margins of said channel prevent a lateral tearing of the band. As the container preferably shows ventilation holes in the lid encircled by the band, it is useful to provide the band, too, with corresponding holes. To prevent the band from sticking to the lid, an air pervious filler is preferably arranged in a channel of the lid into which the ventilation holes open. Preferably the band is so wide as to cover the abutting faces of lid and container and thus to act as a seal.

The cross-walls of the container have upper portions which extend upwardly beyond the upper edges of the longitudinal container walls, and said upper portions abut against and support the lid so that the lid is held safely in place and cannot fly open if the container falls down, as it fits snugly.

I prefer to have the cross-walls of the container extend upwardly also beyond the top face of the lid so that when containers are stacked upon each other the bottom of the higher container does not lie tightly against the top face of the lid of the lower container. Thus the ventilation of the containers by the ventilation holes is guaranteed.

The lid may be joint-like fastened to the container along one longitudinal side by an adhesive strip pasted over the separating gap.

It occurs that the containers are exposed to the sun while being reloaded. This leads to a quick decay of the fish roe or fry. Therefore a container according to the invention is preferably provided on the outside with a layer reflecting heat rays. The reflecting layer may consist of a pasted on synthetic or metal foil; it may, however, just as well be applied as aluminum paint. A particularly favorable result is gained by spraying on of metal, preferably aluminum.

A frame to be used in a container according to the invention preferably consists of a heat insulating material covered with a sieve netting of water and rot-proof material. Artificial foam material or pressed cork is especially suitable as heat insulating material. Frames of artificial foam material are so very light that when handling them and when filling in the roe and/or fry or when piling the frames upon each other, the roe or fry is not crushed. The piled frames form a closed thermically insulating packing. The bottom of the frames, too, may be made of artificial foam material or pressed cork. Thus, the whole container becomes divided into chambers insulated from each other. Therefore the thermical insulation is threefold: on the outside is the container which may just as well consist of artificial foam material or pressed cork, then follows an air layer between the container and the frame package, and then follow the piled up frames the sides of which form continuous walls. The interior is insulated from all sides: from the side walls, from the lid and from the bottom. If the bottom of the frames consists of a heat insulating material it has preferably openings. Suitably these openings are in the form of slots widening toward the bottom. Generally speaking the openings have to be wide enough to guarantee a sufficient wetting of the roe or fry and they have to be narrow enough to prevent the melted ice from flowing or trickling too rapidly through the frame bottoms. Suitably the holes are in the form of slots as circular holes are easily clogged by the ball-like roe. The melted ice cannot flow through the holes and thereby suffocate the roe. Suitably the slot-like openings widen toward the bottom like funnels do for their cleaning, for instance of mud, by means of a strong water jet directed toward the bottom side of the frame bottom is facilitated. This makes it possible to use the frames several times.

Preferably the frames have projections on the bottom side and cavities on the top side, the position of which cavities on the top side corresponds to the position of the projections on the bottom side. Thus the frames interlock when being piled up.

Suitably the frames are provided with depressions on the longitudinal and/or front sides which serve for the reception of material as for instance cords. Thus, piled up frames may be bundled in packages and these packages may easily be put into the container. Foamable polystyrene, known as an excellent heat insulator, is particularly suitable as an artificial foam material within the scope of the invention. Moreover polystyrene is absolutely water-proof and shows the resistance and stiffness necessary for the purpose of the invention.

Further details of the present invention will become apparent from the following description of a preferred embodiment of the invention when taken with the drawings.

FIG. 1 is a perspective view of a container according to the invention without lid and unfilled;

FIG. 2 shows the container according to FIG. 1 from above, filled with a frame package, the topmost frame being visible;

FIG. 3 is a fragmentary sectioned longitudinal view of the container according to FIG. 2 on an enlarged scale showing four piled up frames;

Figure 4:
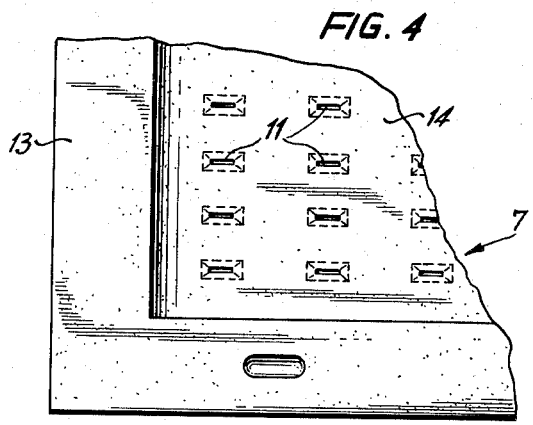
FIG. 4 is a fragmentary plan view of a frame on an enlarged scale.
Figure 5:
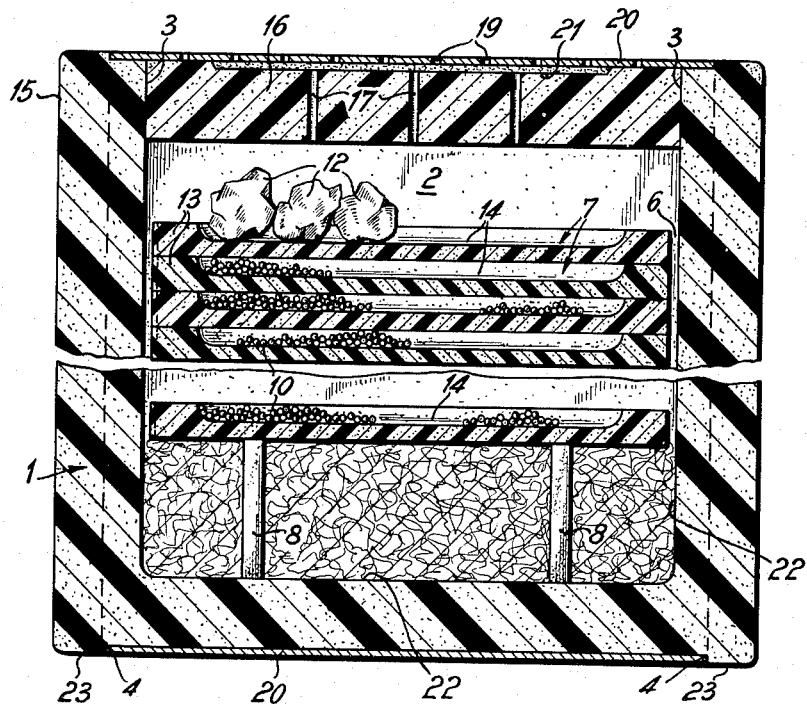
FIG. 5 is a sectioned slide elevation of the whole container with lid.

The container according to the embodiment shown consists of an artificial foam material or of pressed cork. Its cross-walls 15 have upper portions which extend upwardly beyond the upper edges of the longitudinal walls and laterally support the lid 16.

The interior 2 of the container receives a frame package 7. Beneath the frame package 7 remains a chamber 22 for collecting melted ice. This chamber 22 is filled with moss, felt or other moisture absorbent materials.

The lid 16 fits into a recess 3 between the aforesaid upper portions of the cross-walls 15 of the container 1.

Around the container 1 a channel 4 is arranged into which a paper band 20 reinforced in longitudinal direction by strings or glass fiber cords is inserted. The side limitation of the channel 4 prevents a lateral tearing of the paper band 20.

The container 1 shows an opening 5 for gripping and lifting the lid 16 with the finger tips.

An air gap 6 remains between the inside wall of the container 1 and the frame parcel 7 all around.

The various frames 7 consist of an artificial foam material or of pressed cork. The frames show cutouts 7a and 7b for strings by means of which they are bundled to packages.

Supports 8 keep the frame package 7 in a certain height. Said supports are arranged within the container along its longitudinal walls.

The bottom side of the frames 7 shows projections 9 and depressions opposite said projections on the top side. When the containers are piled up these projections engage the depressions.

The fish roe 10 and/or the fry can be spread all over the bottom 14 of the frames 7. Slot-like holes 11 are spaced in the frame bottoms 14 widening toward the bottom.

The margins 13 of the piled up frames 7 and the air layer 6 between the frame package and the container 1 as well as the walls of the continer 1 form three independent insulating layers.

On the topmost frame 7 ice 12 is deposited, and melted ice trickles through the slots 11, thus cooling and wetting the roe or fry lying on the frame bottoms 14.

The lid 16 shows ventilation holes 17 opening in the interior 2 of the container 1 and on the outside in a shallow channel or sunken region 21 in the lid 16. The channel 16 is covered with a porous filler penetrable by air preventing a direct sticking of the paper band 20 provided with holes 19 to the lid 16, which would close the holes 17.

Elevations 23 on the outside of the bottom of the container 1 prevent tight lying of the containers 1 against each other when the containers are piled up, which would cause poor ventilation by the holes 19 resp. 17.

What is claimed is:

1. A transport and cooling container for living marine life such as fish roe and/or fry comprising (a) a boxlike container made of heat-insulating material and including side walls, a bottom, and a lid,
(b) a stack of flat frames within said container, said frames having side walls made of heat-insulating material and offering flush outer faces, said outer faces and the inner faces of said container side walls defining, with said frames in stacked condition, an all-around free space, each of said frames being formed for holding fish fry and having a bottom made of heat-insulating material and being spacedly provided with apertures, each of said frames when stacked forming an all-around heat-insulated chamber, and
(c) a support for said stack to hold the lowermost frame of said stack a distance away from said container bottom, said stack being of such a height that there will be a free space between the uppermost frame of said stack and the lid when placed upon the container.

2. In the container according to claim 1, said apertures being slotlike and flaring downwardly and outwardly.

3. The container according to claim 1, wherein said container side walls include two longitudinally and two crosswise extending parallel walls, said cross-walls having upper portions extending upwardly beyond the upper edges of said longitudinal walls, and said lid is of platelike shape and is seated upon said upper edges between said upper portions.

4. In the container according to claim 3, said container bottom, said longitudinal walls and said lid having on the outside sunken regions continuously and circumferentially extending about said container, said sunken regions extending over meeting edges of said cross-walls and said lid, a band received in said sunken regions in a girthlike fashion.

5. In the container according to claim 4, said band being apertured across the area of said lid, said lid being provided with holes communicating, over the apertures in said band, between said free space between said uppermost frame and said lid, on the one hand, and the outside, on the other hand.

6. In the container according to claim 5, said lid having a sunken portion on the outside thereof, a layer of porous material being received in said sunken portion.

7. In the container according to claim 1, each of said frames being provided with recess means for receiving material.

References Cited by the Examiner

UNITED STATES PATENTS

| 149,198 | 3/74 | Clark | 119—3 |
|---|---|---|---|
| 376,553 | 1/88 | Sandford | 119—3 |
| 884,140 | 4/08 | Erlwein et al. | 119—5 |
| 2,026,417 | 12/35 | Conway et al. | 119—19 |
| 2,266,664 | 12/41 | Stevens | 119—2 |
| 2,328,993 | 9/43 | Norling | 43—55 |
| 2,680,424 | 6/54 | Brown | 119—3 |
| 2,885,819 | 5/59 | Newell et al. | 43—55 |

SAMUEL KOREN, *Primary Examiner.*

ALDRICH F. MEDBERY, *Examiner.*